United States Patent
Lee et al.

(10) Patent No.: US 7,356,331 B2
(45) Date of Patent: Apr. 8, 2008

(54) SYSTEM AND METHOD OF DELETING A CALL LOG AND MESSAGE LOG IN A MOBILE PHONE

(75) Inventors: Moon-Heui Lee, Kumi-shi (KR); Sung-Ok Song, Kumi-shi (KR); Soo-Ryeol Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 385 days.

(21) Appl. No.: 10/658,205

(22) Filed: Sep. 10, 2003

(65) Prior Publication Data

US 2004/0058672 A1  Mar. 25, 2004

(30) Foreign Application Priority Data

Sep. 14, 2002  (KR) ............. 10-2002-0055943
Nov. 1, 2002   (KR) ............. 10-2002-0067447
Aug. 25, 2003  (KR) ............. 2003-58689

(51) Int. Cl.
    *H04L 12/58* (2006.01)
(52) U.S. Cl. ............... 455/412.1; 455/412.2; 455/415; 455/418
(58) Field of Classification Search ........... 455/410, 455/412.1, 412.2, 415, 416, 457, 466, 517, 455/520, 67.7, 566, 567, 186.1
    See application file for complete search history.

(56) References Cited

U.S. PATENT DOCUMENTS

| | | | |
|---|---|---|---|
| 5,867,796 A * | 2/1999 | Inutsuka | 455/567 |
| 5,983,093 A * | 11/1999 | Haimi-Cohen | 455/411 |
| 6,219,410 B1 * | 4/2001 | Sun | 379/156 |
| 2002/0029246 A1 * | 3/2002 | Kumagai | 709/205 |
| 2002/0065108 A1 * | 5/2002 | Tsukamoto | 455/564 |
| 2002/0094806 A1 * | 7/2002 | Kamimura | 455/415 |
| 2003/0153337 A1 * | 8/2003 | Ito | 455/517 |

* cited by examiner

Primary Examiner—Duc M. Nguyen
Assistant Examiner—Dai Phuong
(74) Attorney, Agent, or Firm—Roylance, Abrams, Berdo & Goodman, LLP

(57) ABSTRACT

A system and method of automatically deleting logged calls and messages in a mobile phone, in order to maintain security and protect privacy. The system and method employ the operations of: selecting a log deleting management database from a menu; inputting a password; displaying types of log deleting management database if the input password is correct; and performing at least one of recording a new telephone number, a method of dialing the new telephone number and a method of recording the new telephone number when the new telephone number record is selected from the log deleting management database.

23 Claims, 7 Drawing Sheets

SYSTEM AND METHOD OF DELETING A CALL LOG AND MESSAGE LOG IN A MOBILE PHONE

PRIORITY

This application claims priority under 35 U.S.C. § 119 to an application entitled "Method of Automatically Deleting Call Log and Message Log in a Mobile Phone" filed with the Korean Intellectual Property Office on Sep. 14, 2002 and assigned Serial No. 2002-55943, to an application entitled "Method of Automatically Deleting Call Log and Message Log in a Mobile Phone" filed with the Korean Intellectual Property Office on Nov. 1, 2002 and assigned Serial No. 2002-67447, and to an application entitled "Method of Deleting Call Log and Message Log in Mobile Telephone" filed with the Korean Intellectual Property Office on Aug. 25, 2003 and assigned Serial No. 2003-58689, the entire contents of all three applications are incorporated herein by reference.

BACKGROUND OF THE INVENTION

1. Field of the Invention

The present invention relates to a system and method of automatically deleting logged calls and messages in a mobile phone, and more particularly to a system and method of automatically deleting any logged calls and messages, which a user prefers not be recorded on the mobile phone, in order to maintain security and protect privacy.

2. Description of the Related Art

Currently available mobile phones store all telephone numbers and messages which are received or sent. Some of the stored telephone numbers or messages can be very important to a business user of a mobile phone and must be kept secret from others. Therefore, the user has to endure the inconvenience of deleting such telephone numbers or messages stored in a daily call log or a message log of the mobile phone. It should be appreciated that users other than business users may also have a need to keep all telephone numbers and messages which are received or sent a secret from others.

SUMMARY OF THE INVENTION

Accordingly, the present invention has been made to solve the above-mentioned problems occurring in existing mobile phones. It is an object of the present invention to provide a system and method of automatically deleting any logged calls and messages, which a user prefers not be recorded on a mobile phone, in order to maintain security and protect privacy.

In order to substantially accomplish this object and others, the present invention provides a system and method of automatically deleting logged calls and messages in a mobile phone, in order to maintain security and protect privacy. The system and method employ the operations of selecting a log deleting management database from a menu; inputting a password; displaying types of the log deleting management database if the input password is correct; and recording at least one of a new telephone number, a method of dialing the new telephone number and a method of recording the new telephone number when the new telephone number record is selected from the log deleting management database.

Also to substantially accomplish the aforementioned object, the present invention provides a system and method of automatically deleting logged calls and messages in a mobile phone, in order to maintain security and protect privacy. The system and method employ the operations of determining whether a telephone number received with a voice call is present in a phonebook; displaying the number on a display section of the mobile telephone; and detecting telephone numbers stored in a log deleting management database. The system and method further employ the operations of determining whether the received telephone number is included in the telephone numbers stored in the log deleting management database; recording the received telephone number, in a recently received number list and then performing a communication function. The system and method also employ the operations of searching for a method of recording the number, if the number is present in the log deleting management database; and recording the number in a secret received number list; and performing a communication function, if the method of recording the number is recorded in the secret received number list.

To substantially accomplish the aforementioned object, the present invention further provides a system and method of automatically deleting logged calls and messages in a mobile phone, in order to maintain security and protect privacy. The system and method employ the operations of inputting a telephone number; pressing a "send" key on the mobile phone; determining whether the input number is present in a phonebook of the mobile phone and displaying the number on a display section. The system and method further employ the operations of reading telephone numbers stored in a log deleting management database; determining whether the input telephone number is included in the telephone numbers stored in the log deleting management database; and recording the input telephone number, if the input telephone number is not present in the log deleting management database, in a recently dialed number list. The system and method further employ the operations of performing a dialing function; searching for a method of dialing the number, if the input telephone number is present in the log deleting management database; and performing a dialing function while concealing said number and a caller's name.

To still further substantially accomplish the aforementioned object, the present invention provides a system and method of automatically deleting logged calls and messages in a mobile phone, in order to maintain security and protect privacy. The system and method employ the operations of receiving a message; parsing the received message and a received telephone number; determining whether the received telephone number of the received message is present in a phonebook of the mobile phone, displaying the received message and received telephone number on a display section of the mobile telephone; and reading telephone numbers stored in a log deleting management database. The system and method further employ the operations of determining whether the telephone number of the received message is included in the telephone numbers stored in the log deleting management database; recording the received message and telephone number in a received message list and performing any next function; if the telephone number is not present in the log deleting management database; determining whether the received message and telephone number should be recorded in a secret received message list; recording the received message and telephone number in the secret received message list; and performing any next function if the received message and telephone number are determined to be recorded in the secret received message list.

Also, the present invention further provides a system and method of automatically deleting logged calls and messages in a mobile phone, in order to maintain security and protect privacy. The system and method employ the operations of inputting a message and a telephone number and sending the input message and telephone number; reading telephone numbers stored in a log deleting management database; determining whether the sent telephone number is included in the telephone numbers stored in the log deleting management database; recording the sent message and the sent telephone number in a sent message list. The system and method further employ the operations of performing a message sending function; determining whether the sent message and the sent telephone number should be recorded in a secret sent message list if the sent telephone number is present in the log deleting management database; and recording the sent message and the sent telephone number in the secret sent message list, if the sent telephone number is present in the log deleting management database; and performing a message sending function for the sent message and sent telephone number.

DETAILED DESCRIPTION OF THE PREFERRED EMBODIMENTS

Several embodiments of the present invention will be described in detail with reference to FIGS. 1 to 7. Also, a detailed description of known functions and configurations have been omitted for conciseness.

Figure 1:
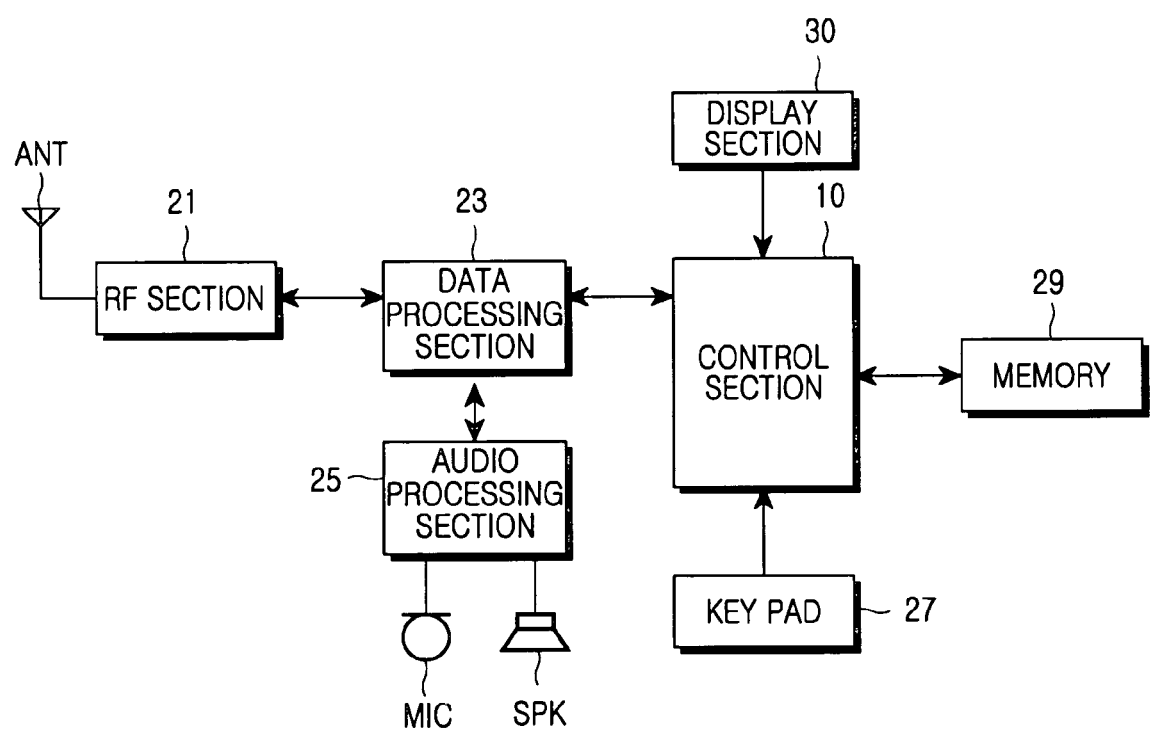
FIG. 1 shows an example of components for a mobile phone in accordance with an embodiment of the present invention.

FIG. 1 shows an example of components for of a mobile phone in accordance with an embodiment of the present invention. Specifically, the wireless telephone in FIG. 1 comprises a control section 10, a radio frequency (RF) section 21, a data processing section 23, an audio processing section 25, a keypad section 27, a memory 29, a display section 30, a speaker SP, a microphone MIC, and an antenna ANT. The RF section 21 enables communications through a mobile phone. The RF section 21 comprises a RF transmitter (not shown) for performing upward conversion and amplification of the frequency of a transmitting signal and an RF receiver (not shown) for amplifying a receiving signal with low noise and performing downward conversion of the frequency of the receiving signal. The data processing section 23 comprises a transmitter (not shown) for coding and modulating the transmitting signal and a receiver (not shown) for demodulating and decoding the receiving signal. That is, the data processing section 23 can be composed of a MODEM and a coder/decoder (CODDEC).

The audio processing section 25 reproduces an audio signal being received and output from the data processing section 23, or transmits an audio signal being transmitted and generated from a microphone to the data processing section 23. The keypad 27 comprises function keys for setting up keys and various functions to input numbers and characters.

The memory 29 can comprise a program memory and a data memory. The program memory stores programs for controlling general operations of the mobile phone. The data memory temporarily stores data generated during implementation of the programs. The memory 29 stores a log deleting management database that records telephone numbers which should be automatically deleted from a call log and a message log in order to maintain security and protect privacy. Also, the memory 29 stores a secret received number list for storing a received telephone number which is recorded in the log deleting management database, a secret received message list for storing a message received from a telephone number which is recorded in the log deleting management database, and a secret sent message list for storing a message sent to a telephone number which is recorded in the log deleting management database. For security purposes, the secret received number list, secret received message list and secret sent message list can be accessed only by the user of the mobile phone with a correct password or the like.

The control section 10 controls the general operation of the mobile phone, and can include the data processing section 23. The control section 10 controls the operation of the mobile phone to enable the user to record a new telephone number in the log deleting management database and to delete or correct a telephone number selected among the numbers stored in the log deleting management database, in accordance with an embodiment of the present invention. Also, the control section 10 controls operations of the mobile phone not to record a received or dialed telephone number in a recently received number list or a recently dialed number list, if the number is present in the log deleting management database, according to the embodiment of the present invention. In addition, the control section 10 controls whether to record or not to record a received telephone number, which is present in the log deleting management database, in the secret received number list, depending on the method of recording the number.

The control section 10 controls operations of the mobile phone not to record a message received from or sent to a telephone number present in the log deleting management database, in a received message list or a sent message list. Such a message is controlled to be recorded in the secret received message list or the secret sent message list, depending upon the user's choice.

The display section 30 displays a message generated during the implementation of a program under the control of the control section 10, and the user's key operation status when a call function is performed. Also, the display section 30 displays the telephone numbers stored in the log deleting management database under the control of the control section 10, when the user of the mobile phone selects the log deleting management database in accordance with an embodiment of the present invention. The display section 30 displays the telephone numbers stored in the secret received number list under the control of the control section 10, when the user of the mobile phone selects the secret received number list from the log deleting management database, in accordance with an embodiment of the present invention.

The operations of the mobile phone will be explained with reference to FIG. 1. If the user sets up a calling mode for communication after dialing on the keypad 27, the control section 10 detects the calling mode, processes the dialed information received from the data processing section 23, converts the information into an RF signal through the RF section 21, and outputs the signal. If the called party generates a response signal, the RF section 21 detects the response signal via the data processing section 23. A voice calling path is established via the audio processing section 25 to enable communication. If the mobile phone is in an incoming mode, the control section 10 detects the incoming mode via the data processing section 23. The control section 10, generates a ring signal via the audio processing section 25. If the user responds, the control section 10 detects the response, and forms a voice calling path through the audio processing section 25 to enable communication. Although voice communication is explained as an example of communications in calling or incoming mode, data communications for packet or image data can also be performed in such a mode. In addition, in call waiting mode or character communications mode, the control section 10 displays the character data processed by the data processing section 23 on the display section 30.

The operation of automatically deleting any logged calls and messages, which are preferred by a user to not be recorded in a mobile phone, for security maintenance and privacy protection, will be explained in detail. The user of the mobile phone can store telephone numbers, which are preferred to not be recorded in the mobile phone, in the log deleting management database. When a voice call is made, the control section 10 determines whether the telephone number received with the voice call is present in the log deleting management database. If the received telephone number is present in the log deleting management database, the control section 10 will not record the number in the recently received number list. The non-stored telephone number can be stored in the secret received number list, depending on the method of recording the number.

When the user of the mobile phone tries to make a phone call by inputting a telephone number, the control section 10 determines whether the telephone number is present in the log deleting management database. If the number is present, the control section 10 will not record the number in the recently dialed number list. The user can make a phone call to the number which was not stored while concealing or displaying the number and the caller to the recipient of the call, depending on the method of dialing the same number.

When a message is received, the control section 10 determines whether the telephone number received with the message is present in the log deleting management database. If the telephone number is present in the log deleting management database, the control section 10 will not store the message in the received message list. The non-stored message can be stored in the secret received message list, upon the user's choice.

When the user of the mobile phone sends a message, the control section 10 determines whether the telephone number of the message recipient is present in the log deleting management database. If the telephone number is present in the log deleting management database, the control section 10 will not store the message in the sent message list. The non-stored message can be stored in the secret sent message list, depending upon the user's choice.

Figure 2:
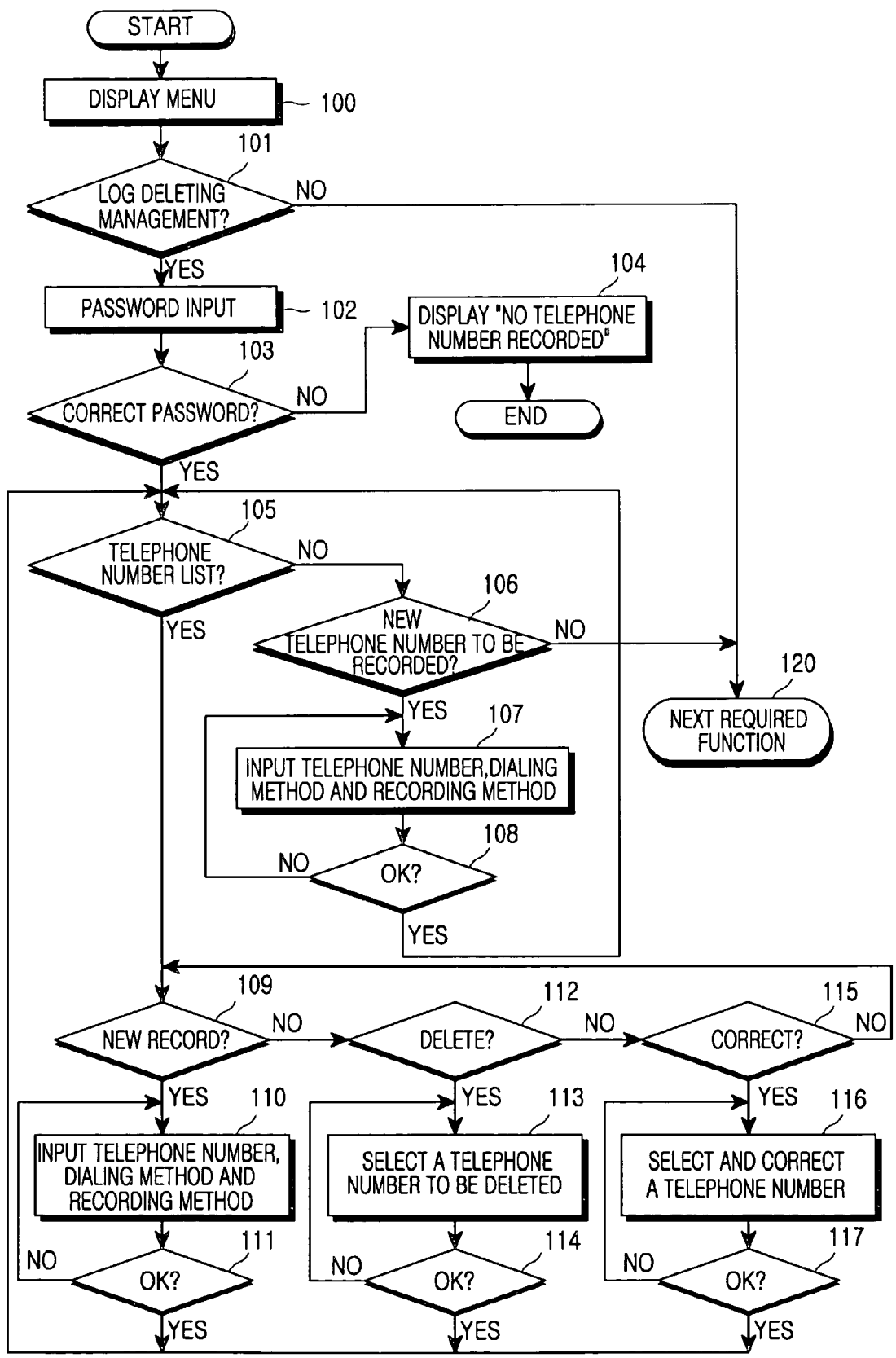
FIG. 2 is a flowchart showing an example of steps for recording and managing telephone numbers in a log deleting management database in a mobile phone in accordance with an embodiment of the present invention.

FIG. 2 is a flowchart showing an example of steps for recording and managing telephone numbers in a log deleting management database in a mobile phone in accordance with an embodiment of the present invention.

The embodiment of the present invention shown in FIG. 2 will now be explained in more detail, with reference to FIG. 1.

If the user of the mobile phone presses a menu key on the keypad 27, the control section 10 will detects the selection controls the display section 30 to display the menu in step 100. If the user selects the log deleting management database using the keypad 27 while the menu is displayed, the control section 10 will detects this selection in step 101 and displays a message to the user requesting a password input. If the user inputs a password in step 102, the control section 10 determines whether the input password is correct. If the password is correct, the control section 10 detects it in step 103 and displays types of the log deleting management database on the display section 30.

If the password input by the user is not correct, the control section 10 detects it in step 103 and proceeds to step 104 for displaying a message "no telephone number recorded" on the display section 30. A person other than the user can input a password to see the log deleting management database of the mobile phone. If the message "no telephone number recorded" is displayed, the unauthorized user believes that there is no recorded telephone number, and will not try to input another password. At least one message can be stored in a memory 29 and displayed in step 104. The user can select the one message to be displayed.

If the user selects an option to record a telephone number while the types of the log deleting management database are displayed, the control section 10 detects it in step 106 and proceeds to step 107. In step 107, the user of the mobile phone can input a new telephone number which the user prefers not be recorded in a general call log or a message log, a method of dialing the number and a method of recording the number. The user can input a new telephone number directly using the keypad or using a phonebook. The dialing method refers to a determination of whether a telephone number input in step 107 and the caller should be revealed to the recipient when the number is dialed. The recording method refers to a determination of whether a telephone number input in step 107, if received, should be recorded in the secret received number list. If an "OK" key is input when a telephone number input in step 107 is completed, the control section 10 detects it in step 108 and stores the input new telephone number and the method of dialing and recording the number in the log deleting management database. If the "OK" key is not input in step 108, the method returns to step 107.

If the user selects an option to not record a telephone number in step 106 or not to access the log deleting management database in step 101, the control section 10 detects it and proceeds to step 120 where the user decides on the next required function.

If the user selects a telephone number list while the types of log deleting management database are displayed, the control section 10 detects it in step 105 and displays the telephone numbers stored in the log deleting management database on the display section 30. If the user selects a new record while the telephone numbers stored in the log deleting management database are displayed, the control section 10 detects it in step 109 and proceeds to step 110. In step 110, the user can input a new telephone number, which the user prefers not be recorded in the general call log or the message log, a method of dialing the number or a method of recording the number. The user can input a new telephone number directly or using the phonebook. The dialing method refers to a determination of whether a telephone number input in step 107 and the caller's name should be revealed to the recipient, when the number is dialed. The recording method refers to a determination of whether a telephone number input in step 110, if received, should be recorded in the secret received number list. If the "OK" key is input when a telephone number input in step 110 is completed, the control section 10 detects it in step 111 and stores the newly input telephone number and the method of dialing and recording the number in the log deleting management database.

If the user selects a deletion while the telephone numbers stored in the log deleting management database are displayed, the control section 10 detects it in step 112 and proceeds to step 113. If the user presses the "OK" key in step 113 after selecting a telephone number to delete, the control section 10 detects it in step 114 and deletes the selected telephone number from the log deleting management database.

If the user selects a correction while the telephone numbers stored in the log deleting management database are displayed, the control section 10 detects it in step 115 and proceeds to step 116. If the user presses the "OK" key in step 113 after selecting a telephone number to be corrected, the control section 10 detects it in step 117 and stores a corrected telephone number in the log deleting management database.

Figure 3:
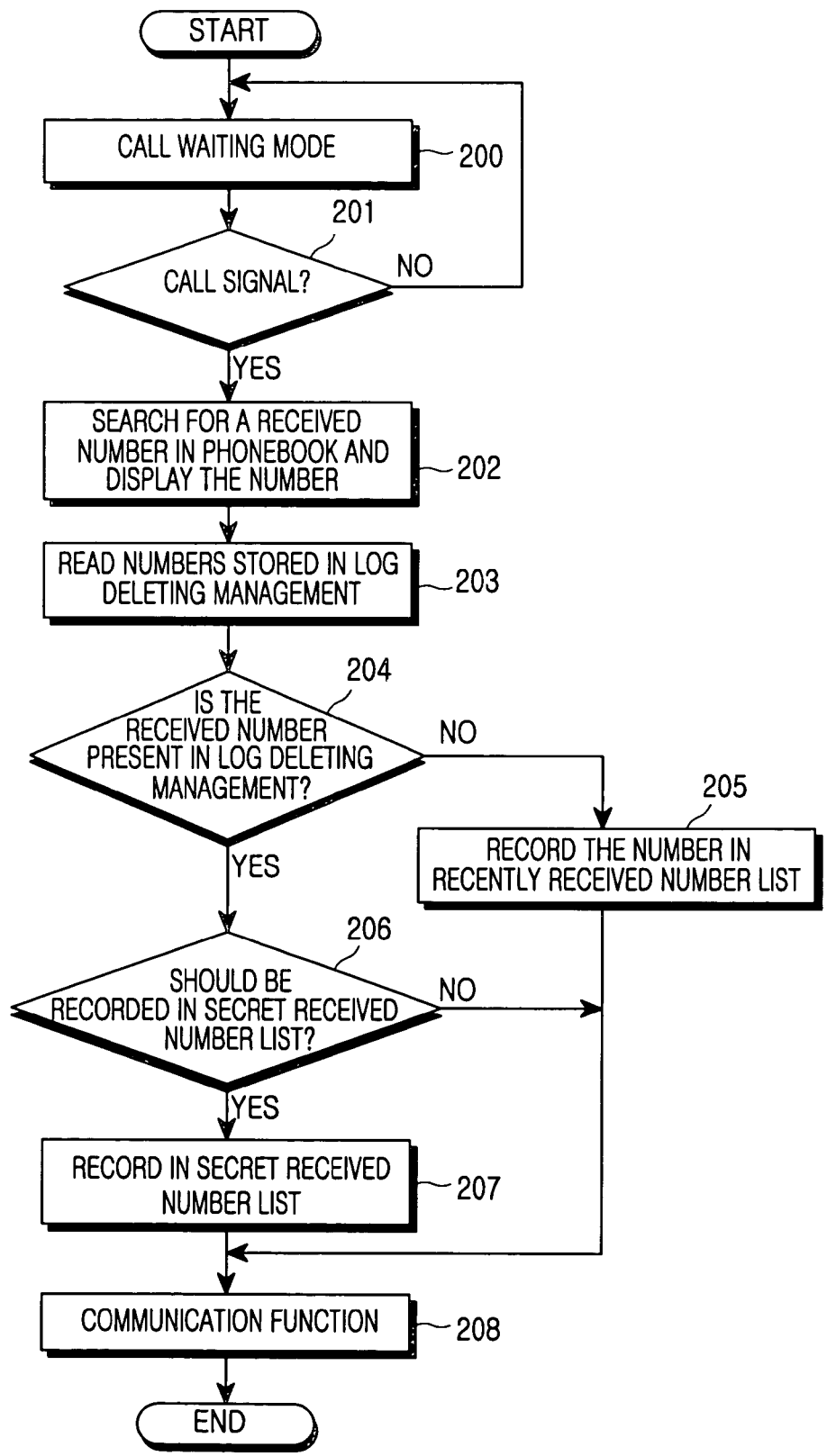
FIG. 3 is a flowchart showing an example of steps for automatically deleting a received telephone number corresponding to a log deleting management database in a mobile phone in accordance with an embodiment of the present invention.

FIG. 3 is a flowchart showing an example of steps for automatically deleting a received telephone number corresponding to a log deleting management database in a mobile phone in accordance with an embodiment of the present invention.

Hereinafter, the embodiment of the present invention shown in FIG. 3 will be described in more detail, with reference to FIGS. 1 and 2.

In step 200, if a voice call is received while the mobile telephone is in a call waiting mode, the control section 10 will detects it in 201 and proceeds to step 202 for reading the telephone numbers stored in a phonebook of the mobile phone. In step 202, the control section 10 determines whether the received telephone number is present in the phonebook and provides a number identification service via the display section 30. If the number is present in the phonebook, the display section 30 displays the number and any pertinent information stored in the phonebook that is associated with the stored telephone number, namely, the caller's name. In step 203, the control section 10 reads the telephone numbers stored in the log deleting management database. The control section 10 then determines whether the received telephone number is stored in the log deleting management database. If the received number is not stored in the log deleting management database the control section 10 detects it in step 204 and proceeds to step 205. In step 205, the control section 10 stores the received number in the recently received number list and performs a communication or another required function in step 208.

If the received number is present in the log deleting management database in step 203, the control section 10 detects it in step 204 and does not record the received number in the recently received number list. In step 204, the control section 10 determines a method of recording the received number. If the recording method is to record the received number in the secret received number list, the control section 10 detects it in step 206 proceeds to step 207. In step 207, the control section 10 records the received number in the secret received number list and performs a communication or another required function in step 208. On the other hand, if the method of recording the received number is not to record the received number in the secret received number list, the control section 10 detects it in step 206 and performs a communication or any required function, without recording the received number in the secret received number list.

According to the preferred embodiment of the present invention, when a telephone number included in the telephone number list of the log deleting management is received, it is automatically deleted and is not recorded in the general call log or the recently received number list. Alternatively, a message "no caller information" can be displayed for that received number. In other words, when a telephone number present in the log deleting management is received, "no caller information" is displayed in the general call log and the recently received number list. If the user inputs the OK key to identify the telephone number corresponding to the message "no caller information" or the send key to initiate a call, the message "no caller information" will still be displayed, with no information being provided about the received telephone number.

Figure 4:
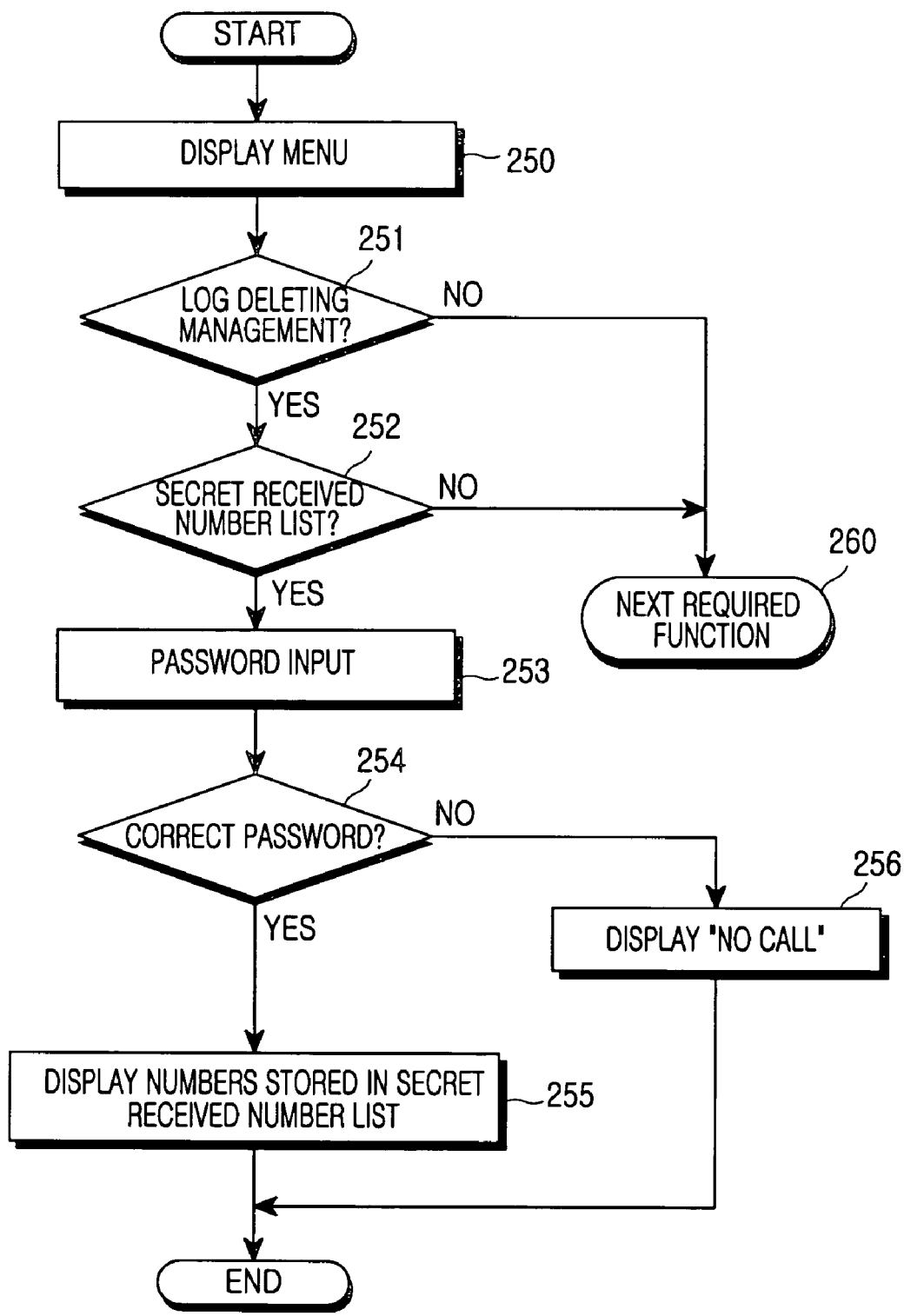
FIG. 4 is a flowchart showing an example of steps for reading the secret received number list of FIG. 3 in accordance with an embodiment of the present invention.

FIG. 4 is a flowchart showing an example of steps for reading the list of secret received telephone numbers of FIG. 3 in accordance with an embodiment of the present invention.

Hereinafter, the embodiment of the present invention shown in FIG. 4 will be described in more detail, with reference to FIG. 1.

If the user of the mobile phone presses a menu key on the keypad 27, the control section 10 detects it and controls the display section 30 to display the menu in step 250. If the user selects the log deleting management database using the keypad 27 while the menu is displayed, the control section 10 detects it in step 251 and displays the types of the log deleting management database on the display section 30. If the user selects the secret received number list while the types of the log deleting management database are displayed, the control section 10 detects it in step 252 and displays a message requesting a password input. If the user inputs a password in step 253, the control section 10 determines whether the input password is correct. If the password is correct, the control section 10 detects it in step 254 and displays the telephone numbers stored in the secret received number list on the display section 30 in step 255.

If the user does not access the log deleting management database in step 251 or does not access the secret received number list in step 252, the method proceeds to step 260 where the user decides upon the next required function. The next required function is beyond the scope of the present invention.

If the password input by the user is not correct, the control section 10 detects it in step 254 and proceeds to step 256 for displaying a message "no telephone number recorded" on the display section 30. A person other than the user can input a password to see the log deleting management database of the mobile phone. If the message "no telephone number recorded" is displayed, the unauthorized user believes that no telephone number is recorded, and will not try to input another password. At least one message can be stored in the memory 29 in order to be displayed in step 256. The user can select one message to be displayed.

Figure 5:
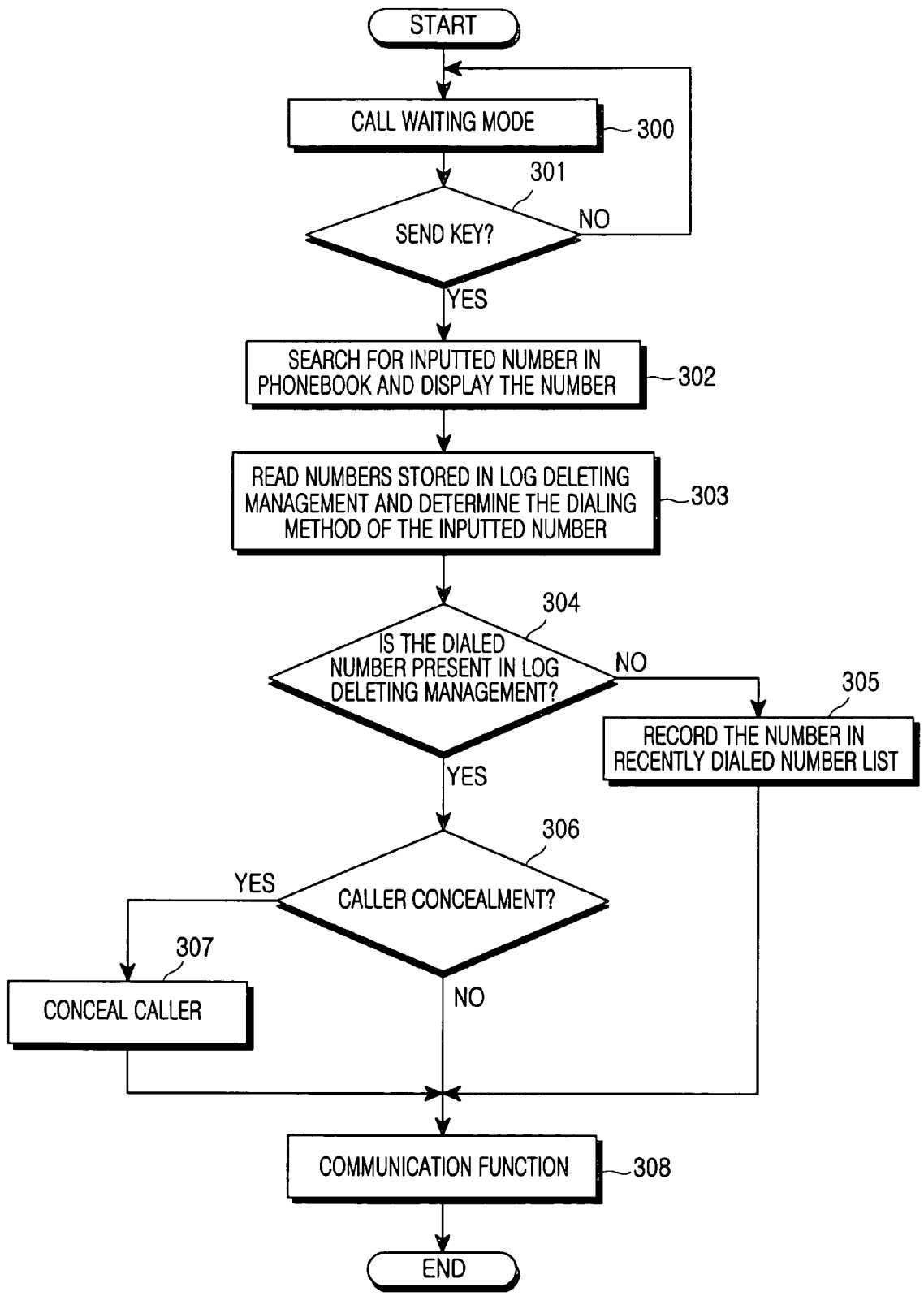
FIG. 5 is a flowchart showing an example of steps for automatically deleting a dialed telephone number corresponding to a log deleting management database in a mobile phone in accordance with an embodiment of the present invention.

FIG. 5 is a flowchart showing an example of steps for automatically deleting a dialed telephone number corresponding to a log deleting management database in a mobile phone in accordance with an embodiment of the present invention.

Hereinafter, the embodiment of the present invention shown in FIG. 5 will be described in more detail, with reference to FIGS. 1 and 2.

If the user inputs a telephone number and presses the "send" key at step 300 to make a phone call while the mobile telephone is in a call waiting mode, the control section 10 detects it in step 301 and proceeds to step 302. In step 302, the control section 10 searches the phonebook to determine whether the telephone number is present, and displays the number on the display section 30. If the telephone number is present in the phonebook, information stored in the phonebook regarding the number, i.e., the recipient, will be displayed on the display section 30. In step 303, the control section 10 reads the telephone numbers stored in the log deleting management database and determines whether the input number is present in the log deleting management database. If the input number is not present, the control section 10 detects the absence of the number in step 304 and proceeds to step 305. In step 305, the control section 10 stores the input number in the recently dialed number list and performs a dialing function.

If the input number is present in the log deleting management database in step 303, the control section 10 detects that the input number is stored in the management database in step 304 and will not record the number in the recently dialed number list. The control section then proceeds to step 306 for determining a method of dialing the input number. If it is determined in step 306 that the input number should be dialed without revealing the number and the caller to the recipient, the control section 10 proceeds to step 307 for performing a dialing function, while concealing the number and the caller to the recipient. On the other hand, if it is determined in step 306 that the input number should be dialed with the number and the caller name displayed, the control section 10 performs a dialing function in step 308, while displaying the number and the caller.

According to this embodiment of the present invention, when the user dials a telephone number included in the telephone number list of the log deleting management, the number is automatically deleted and is not recorded in the general call log or the recently dialed number list. Alternatively, a message "no caller information" can be displayed for that dialed number. In other words, when a telephone number present in the log deleting management is dialed, "no caller information" is displayed in the general call log and the recently dialed number list. If the user inputs the OK key to identify the telephone number corresponding to the message "no caller information" or the send key to initiate a phone call, the message "no caller information" will still be displayed, with no information being provided about the dialed telephone number.

Figure 6:
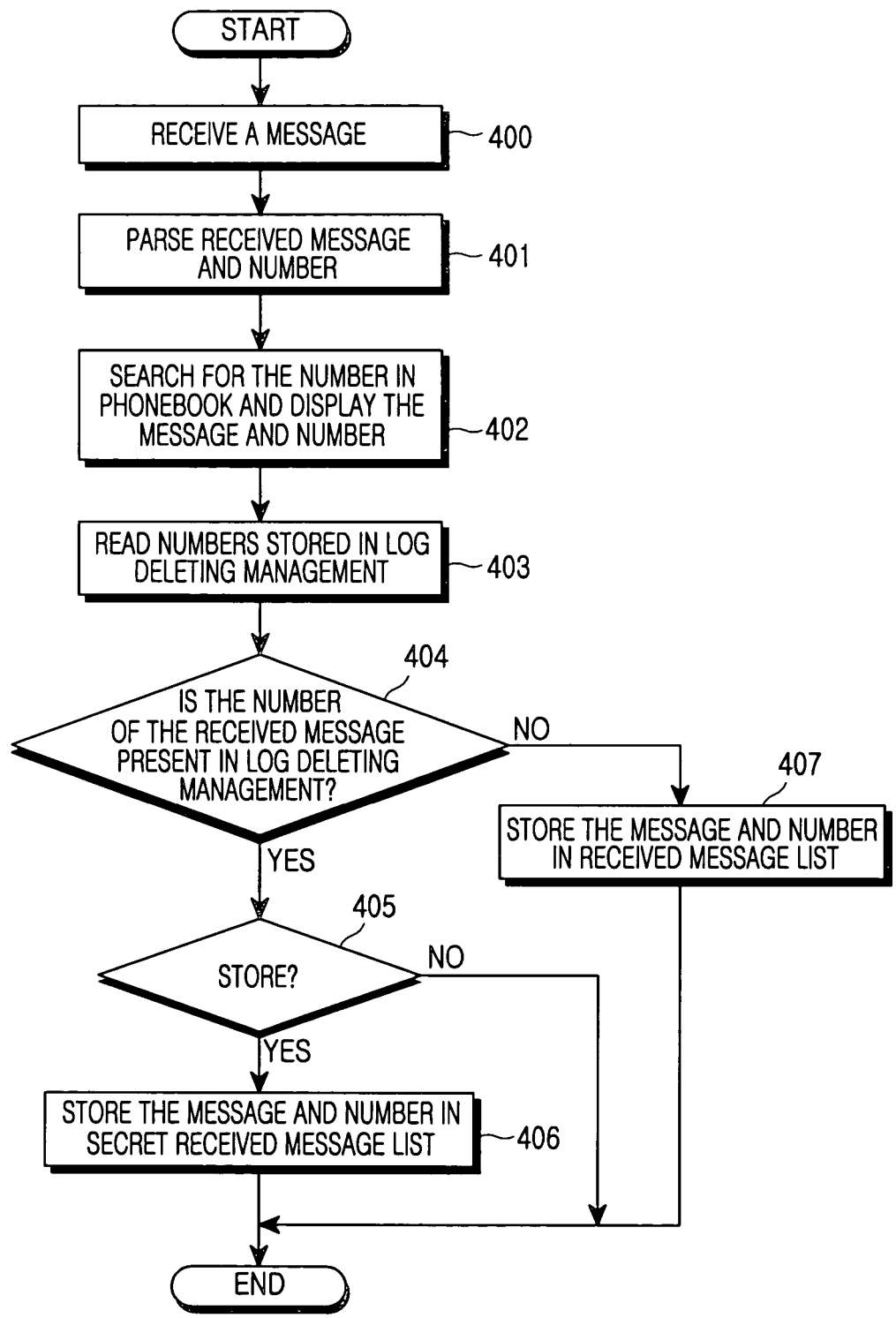
FIG. 6 is a flowchart showing an example of steps for automatically deleting a message received from a telephone number corresponding to a log deleting management database in a mobile phone in accordance with an embodiment of the present invention.

FIG. 6 is a flowchart showing an example of steps for automatically deleting a message received from a telephone number corresponding to a log deleting management database in a mobile phone in accordance with an embodiment of the present invention.

Hereinafter, the embodiment of the present invention shown in FIG. 6 will be described in more detail, with reference to FIGS. 1 and 2.

If a message is received in step 400, the control section 10 proceeds to step 401 for parsing the message and the telephone number received together. In step 402, the control section 10 searches the phonebook of the mobile phone to determine whether the telephone number of the received message is stored in the phonebook, and displays both the message and the telephone number on display section 30. If the telephone number is present in the phonebook, the control section 10 displays the received message and telephone number and the information stored in the phonebook regarding the telephone number, i.e., the caller on the display section 30. In step 403, the control section 10 reads the telephone numbers stored in the log deleting management database and determines whether the telephone number of the received message is stored in the log deleting management database. If the number is not stored, the control section 10 detects that the number is not stored in step 404 and proceeds to step 407. In step 407, the control section 10 stores the received message in the received message list, and then performs another next required function in step 408.

If the telephone number received with the message is stored in the log deleting management database in step 403, the control section 10 detects the stored telephone number in step 404 and does not record the message in the received message list. If the user chooses to store the message in the secret received message list which can be accessed only by the user, the control section 10 detects it in step 405 and proceeds to step 406. In step 406, the control section 10 stores the message in the secret received message list, and performs any next required function in step 408.

According to this embodiment of the present invention, when a message is received from a telephone number included in the telephone number list of the log deleting management, the message is automatically deleted and is not stored in the general received message list. Alternatively, a message "no information" can be displayed for that received message. In other words, when a message is received from a telephone number present in the log deleting management, "no information" is displayed in the general received message list. If the user inputs the OK key to identify the message or the send key to initiate a phone call, "no information" will still be displayed in the general received message list, with no information being provided about the received message.

Figure 7:
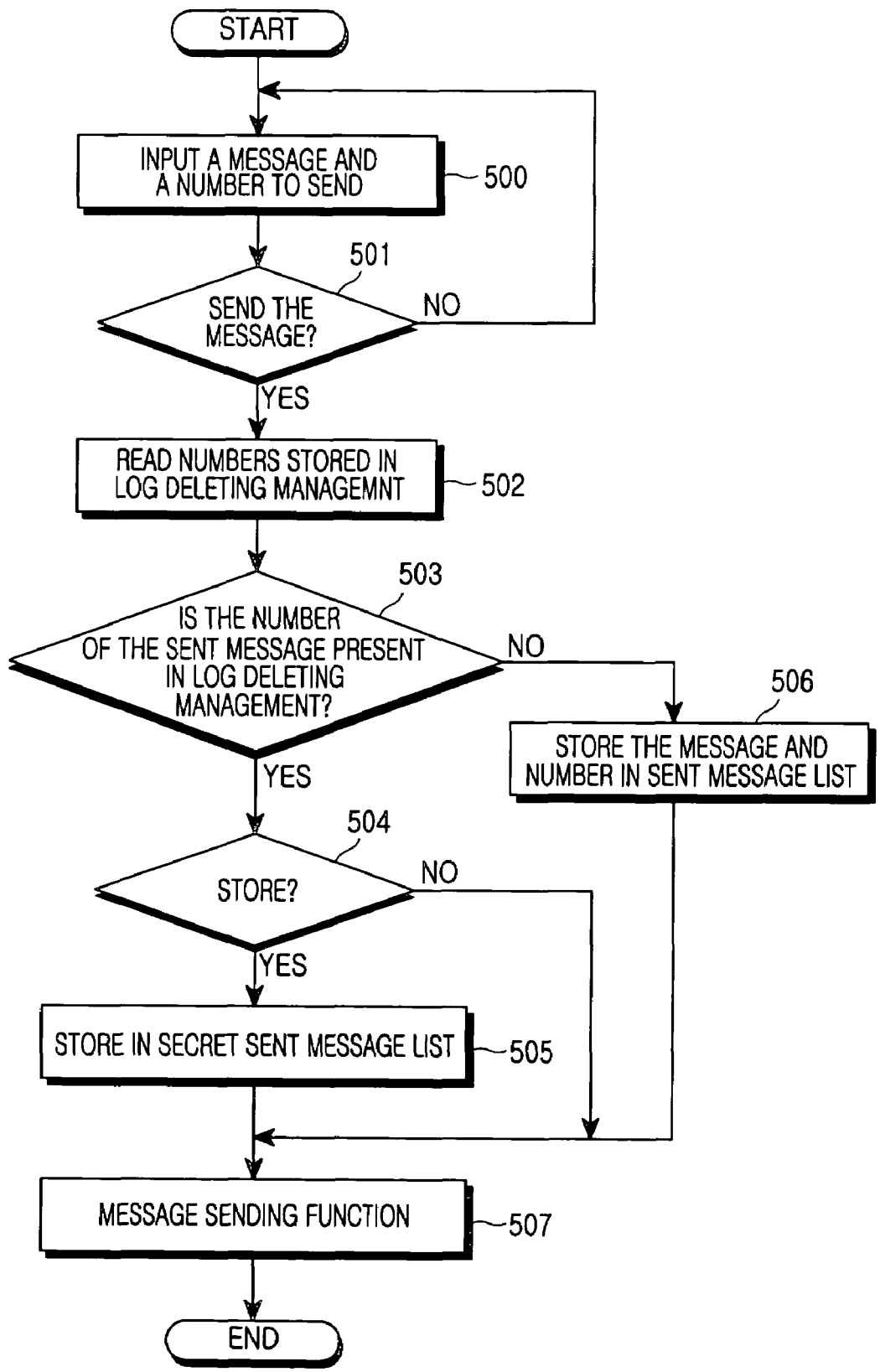
FIG. 7 is a flowchart showing an example of steps for automatically deleting a message sent to a telephone number corresponding to a log deleting management database in a mobile phone in accordance with an embodiment of the present invention.

FIG. 7 is a flowchart showing an example of steps for automatically deleting a message sent to a telephone number corresponding to a log deleting management database in a mobile phone in accordance with an embodiment of the present invention.

Hereinafter, the embodiment of the present invention shown in FIG. 7 will be described in further detail, with reference to FIGS. 1 and 2.

The control section 10 detects that the user inputs a message and a telephone number to send and presses the "OK" key in step 500, and in step 501 and proceeds to step 502. In step 502, the control section 10 reads the telephone numbers stored in the log deleting management database, and determines whether the telephone number dialed to send the message is present in the log deleting management database. The control section 10 detects that the number is not present in step 503 and proceeds to step 506. In step 506, the control section 10 stores the message in the sent message list, and performs a message sending function.

The control section 10 detects that the telephone number dialed to send the message is stored in the log deleting management database in step 503 and does not record the message in the sent message list. If the user chooses to store the message in the secret sent message list, which can be accessed only by the user, the control section 10 detects it in step 504 and proceeds to step 505. In step 505, the control section 10 stores the message in the secret sent message list, and performs any next required function in step 507.

According to this embodiment of the present invention, when a message is sent to a telephone number included in the telephone number list of the log deleting management, the message is automatically deleted and is not stored in the general sent message list. Alternatively, a message "no information" can be displayed for that sent message. In other words, when a message is sent to a telephone number present in the log deleting management, "no information" is displayed in the general sent message list. If the user inputs the OK key to identify the sent message or the send key to initiate a phone call, "no information" will still be displayed in the general sent message list, with no information being provided about the sent message.

Also, when a voice message is received from a telephone number included in the telephone number list of the log deleting management, the user can hear the voice message in a secret voice mailbox. The voice message is not recorded in a general voice mailbox. For the voice message, a message "no information" can be displayed in the general voice mailbox. Even if the OK key is input, the received voice message cannot be heard in the general voice mailbox.

In addition, it is possible to set a special incoming icon or bell sound for the telephone numbers stored in the log deleting management. Alternatively, a distinguishing character picture or sound, wherein the bell sound can comprise a ringing tone, can be set for those telephone numbers.

The present invention having the construction and operations as explained above produces advantageous effects.

That is, an embodiment of the present invention for automatically deleting logged calls and messages, which a user prefers not to record in a mobile phone, enables the user of the mobile phone to ensure security maintenance and privacy protection, without having the inconvenience of manually deleting telephone numbers or messages stored in a daily call log or a message log of the mobile phone.

Although embodiments of the present invention have been disclosed for illustrative purposes, those skilled in the art will appreciate that various modifications, additions and substitutions are possible, without departing from the scope of the invention as disclosed in the accompanying claims.

What is claimed is:

1. A method of automatically deleting a call log and message log in order to maintain security in a mobile phone, the method comprising the steps of:

registering a telephone number requiring security maintenance in a log deleting management menu of the mobile phone;

when a telephone number of a call or message received by the mobile phone corresponds to a telephone number registered in the log deleting management, recording the telephone number of the received call in a secret received number list or recording the telephone number of the received message in a secret received message list;

when a telephone number of an outgoing call or outgoing message sent from the mobile phone corresponds to a telephone number registered in the log deleting management, performing a sending function for the outgoing call while concealing information about a sender, or performing a sending function for the outgoing message after recording the outgoing message in a secret sent message list;

when a telephone number of a call or message received by the mobile phone corresponds to a telephone number registered in the log deleting management, automatically deleting the received telephone number from a communication list/recent received number list or from a received message list, or displaying content indicating that there is no information;

when a telephone number of an outgoing call or outgoing message sent from the mobile phone corresponds to a telephone number registered in the log deleting management, automatically deleting the telephone number of the outgoing call or outgoing message from a communication list/recent sent number list or from a sent message list, or displaying content indicating that there is no information; and when the display indicating that there is no information is selected through a predetermined key, performing a control operation such that a corresponding function of the key is not performed.

2. The method according to claim 1, wherein the step of registering the telephone number comprises the step of:

requesting a password input when the log deleting management is selected from a menu of the mobile phone;

displaying types of the log deleting management when the inputted password is correct;

displaying a list of telephone numbers stored in the log deleting management when a telephone number list is selected from the types of the log deleting management; and registering a new telephone number, a method of sending the new telephone number, and a method of recording the new telephone number, when a telephone number registration is selected from the types of the log deleting management.

3. The method according to claim 2, the method further comprising a step of displaying a message indicating that there is no such registered telephone number when the inputted password is incorrect.

4. The method according to claim 2, wherein the method determines whether a caller and a calling number are to be revealed to a recipient when a call is sent to a telephone number stored in the log deleting management.

5. The method according to claim 2, further comprising the steps of:

when a new registration is selected in a state in which the telephone number list is displayed, additionally registering a new telephone number, a method of sending the new telephone number, and a method of recording the new telephone number;

when a deletion is selected in the state in which the telephone number list is displayed, deleting a selected telephone number; and when a correction is selected in the state in which the telephone number list is displayed, correcting a selected telephone number.

6. The method according to claim 2, wherein the recording method determines whether, when a call is received from a telephone number stored in the log deleting management, the received telephone number is to be stored in the secret received number list.

7. The method according to claim 1, wherein the step of recording the telephone number of the received call in the secret received number list comprises the steps of:
when the call is received by the mobile phone, searching whether the received telephone number has been registered in the log deleting management;
when the received telephone number is present in the log deleting management, searching for the method of recording the received telephone number; and
when the method of recording the received telephone number is to record the received telephone number in the secret received number list, recording the received telephone number in the secret received number list and performing a communication function.

8. The method according to claim 7, further comprising a step of searching whether the received telephone number is present in a phonebook and displaying the received telephone number in a display section, when the call is received by the mobile phone.

9. The method according to claim 7, further comprising a step of recording the received telephone number in a recent received number list and performing the communication function when the received telephone number is not present in the log deleting management.

10. The method according to claim 7, further comprising a step of performing the communication function without recording the received telephone number in the secret received number list when the method of recording the received telephone number is not to record the received telephone number in the secret received number list.

11. The method according to claim 7, further comprising a step of reading a telephone number stored in the secret received number list, wherein the step of reading the telephone number comprises the steps of:
requesting a password input when the secret received number list is selected from the log deleting management;
displaying a telephone number stored in the secret received number list when the inputted password is correct; and
displaying a message indicating that there is no communication history when the inputted password is incorrect.

12. The method according to claim 1, wherein the step of performing the sending function for the call comprises the steps of:
when a "send" key is input after a telephone number is input in the mobile phone, determining whether the calling number has been registered in the log deleting management;
when the calling number is present in the log deleting management, searching for the method of sending the calling number; and
when the method of sending the calling number is to conceal a caller, performing a communication function while concealing the calling number and caller which correspond to calling information.

13. The method according to claim 12, further comprising a step of recording the calling number in a recent calling number list and performing the sending function when the calling number is not present in the log deleting management.

14. The method according to claim 12, further comprising a step of displaying the calling number and the caller, which correspond to the calling information, and performing the sending function when the method of sending the calling number is to display the caller.

15. The method according to claim 1, wherein the step of performing the sending function for the message comprises the steps of:
when message sending is selected in the mobile phone, determining if the telephone number of the outgoing message has been registered in the log deleting management;
when the telephone number of the outgoing message is present in the log deleting management, determining if the outgoing message is to be recorded in the secret sent message list; and
when recording the outgoing message in the secret sent message list is selected, recording the outgoing message and the telephone number of the outgoing message in the secret sent message list and performing a message sending function.

16. The method according to claim 15, further comprising a step of recording the outgoing message and the telephone number of the outgoing message in a sent message list, and performing a message sending function when the telephone number of the outgoing message is not present in the log deleting management.

17. The method according to claim 15, further comprising a step of performing a message sending function without recording the outgoing message and the telephone number of the outgoing message in the secret sent message list when recording the outgoing message in the secret sent message list is not selected.

18. The method according to claim 1, further comprising a step of, when the received/sent telephone number is present in the log deleting management, reporting the receiving/sending of a call without displaying the received/sent telephone number.

19. The method according to claim 1, further comprising the steps of:
when voice for a telephone number registered in the log deleting management is stored, storing the voice in a secret voice mailbox, and either not storing the voice in a normal voice mailbox automatically or displaying content indicating that there is no information; and
when the display indicating that there is no information is selected through a predetermined key, performing a control operation such that a corresponding function of the key is not performed.

20. The method according to claim 1, wherein, through a special incoming setup of the mobile phone, a telephone number registered in the log deleting management is set as at least one selected from the group consisting of a special incoming icon, a ring tone, and a character, so as to be operated.

21. The method according to claim 1, wherein the step of recording the received message in the secret received message list comprises the steps of:
when the message is received by the mobile phone, searching whether the telephone number of the received message has been registered in the log deleting management;
when the telephone number of the received message is present in the log deleting management, determining if the received message is to be recorded in the secret received message list; and
when recording the received message in the secret received message list is selected, recording the received message and the telephone number of the received message in the secret received message list.

22. The method according to claim 21, further comprising the steps of:
parsing the received message and the telephone number of the received message when the message is received by the mobile phone; and
searching whether the telephone number of the received message is present in a phonebook, and displaying the received message and the telephone number of the received message in a display section.

23. The method according to claim 21, further comprising a step of not recording the received message and the telephone number of the received message in the secret received message list when recording the received message in the secret received message list is not selected.

* * * * *